United States Patent [19]

Schoen

[11] E Re. 29,350

[45] Reissued Aug. 9, 1977

[54] PROCESS FOR CHLORINATING ETHYLENE POLYMERS

[75] Inventor: Löwhardt A. A. Schoen, Spaubeek, Netherlands

[73] Assignee: Stamicarbon, B.V., Geleen, Netherlands

[21] Appl. No.: 693,953

[22] Filed: June 8, 1976

Related U.S. Patent Documents

Reissue of:

[64] Patent No.: 3,935,181
Issued: Jan. 27, 1976
Appl. No.: 500,942
Filed: Aug. 27, 1974

[51] Int. Cl.[2] ..... C08F 27/03

[52] U.S. Cl. ..... 526/45; 204/159.18; 526/22; 526/44

[58] Field of Search ..... 526/45, 44; 204/159.18

[56] References Cited

U.S. PATENT DOCUMENTS

| | | | |
|---|---|---|---|
| 3,454,544 | 7/1969 | Young et al. | 260/94.9 H X |
| 3,467,640 | 9/1969 | Kaupp et al. | 260/94.9 H X |
| 3,563,974 | 2/1971 | Eckardt et al. | 260/94.9 H |
| 3,759,888 | 2/1973 | Nose et al. | 260/94.9 H |
| 3,935,181 | 1/1976 | Schoen | 526/45 |

*Primary Examiner*—William F. Hamrock
*Attorney, Agent, or Firm*—Cushman, Darby & Cushman

[57] ABSTRACT

A process for chlorinating solid, finely-divided ethylene polymers is disclosed, wherein the resulting chloropolyethylene has a statistical or hybridical distribution of chlorine in the polymer. The polymer is mixed with 10 - 100% by weight of water, based on the weight of the ethylene polymer, and the polymer is chlorinated with chlorine at a temperature which is above the crystalline melting point of the ethylene polymer during [at least 70%] *a portion* of the chorination period. The chlorination pressure is such that the boiling point of water at that pressure is at least equal to the chlorination temperature. The amount of water in the ethylene polymer is maintained at a level of at least 10% by weight based on starting ethylene polymer until the chlorination has proceeded at least to the point where the chlorine content of the polymer is 15% by weight.

The resulting chloropolyethylenes are useful in applications wherein previous chloropolyethylenes have been used, such as for mixing with synthetic polymers to improve the properties thereof.

15 Claims, No Drawings

PROCESS FOR CHLORINATING ETHYLENE POLYMERS

Matter enclosed in heavy brackets [ ] appears in the original patent but forms no part of this reissue specification; matter printed in italics indicates the additions made by reissue.

BACKGROUND OF THE INVENTION

The present invention relates to a processs for chlorinating ethylene polymers. By the term ethylene polymers', the present application refers to both homopolymers of ethylene and copolymers containing at least 50 mol percent of ethylene units, and at least one other ethylinically unsaturated comonomer of 3 - 8 carbon atoms, such as, for instance, propylene, butylene, pentene-1, hexene-1, 4-methylpentene-1, heptene-1 and octene-1.

The halogenation of polyolefins, and especially the chlorination of polyethylene, has been known for a considerable period of time, especially for low-density polyethylenes. Note, for instance, U.S. Pat. No. 2,183,556, indicating that this process was known in 1939.

Chlorinated polyethylene has been commercially available since the [eary] *early* '40s. However, the initial product was expensive and involved difficult methods of preparation, with the resulting polymers exhibiting physical properties which were not as high as desired.

Shortly after the low-pressure polyethylene processes were developed, there was a revival of interest in chlorinated polyethylene, especially the chlorinated polyethylene prepared from so-called high-density polyethylene. Since then, development has continued in the field of chlorination methods for polyethylene, both of the high density and low density types. The methods previously utilized can be catagorized as of three types, the chlorination of polyethylene in solution, in suspension or in bulk.

The chlorination of polyethylene by the solution method is disclosed in, for instance, U.S. Pat. Nos. 2,398,803, 2,748,105, 2,920,064 and 3,060,164. U.S. Pat. No. 2,592,763 discloses the chlorination of polyethylene in an aqueous suspension. The chlorination of polyethylene in a fluidized bed is disclosed in U.S. Pat. No. 2,890,283, and the chlorination of free-flowing polyethylene is disclosed in British Pat. No. 834,905. These two latter processes involve the absence of a liquid dispersing agent or solvent.

The chlorinated polyethylenes which are obtained by the various prior art chlorination methods differ in properties, even if the same starting polyethylene is utilized, and even if the chlorination is effected to the same polymer chlorine content. This difference in properties appears to depend upon whether or not statistical distribution of the chlorine occurs in the chlorinated polyethylene, as explained in French Pat. No. 1,316,044 and British Pat. No. 843,209.

Each of the three prior art chlorination mentioned above, that is, suspension chlorination, solution chlorination and bulk chlorination, involves a number of disadvantages. For instance, solution chlorination is expensive. The solubility of polyethylene in the organic solvents which are inert to chlorine is quite low, so that relatively large quantities of solvent are required. As a rule, expensive halogenated hydrocarbons are used as the chlorination solvent. The chlorinated polyethylene must be freed from the solvent, and freeing the polymer from the last traces of solvent is difficult. The separation is generally cumbersome and expensive. An advantage of the solution chlorination process, however, is that the chlorination reaction proceeds statistically.

At temperatures below the crystalline melting point of the polymer, the chlorination of polyethylene in suspension or in bulk proceeds on a non-statistical basis. A type of block polymer, having chlorinated and unchlorinated segments in the molecule, is obtained unless chlorination is continued until high chlorine contents are achieved. Block copolymers of this type are hard and brittle, whereas in general it is desired to obtain soft and flexible chloropolyethylene, generally having a crystallinity of less than 2% — that is, the chloropolyethylene should be amorphous or substantially amorphous. In some applications, however, chloropolyethylenes having a higher crystallinity, such as a crystallinity of less than 10%, preferably between 5 and 10%, are desired. A two-stage process for obtaining a more statistical chlorination is described in French Pat. No. 1,216,044. In the process of that patent, the second stage is conducted at a rather high temperature, above the crystalline melting point of the polyethylene (the crystalline melting point, as used herein, is the temperature at which the *DSC* crystallinity disappears. This temperature differs from the softening temperature, and is generally lower by 15° - 25° C. For instance, the crystalline melting point of high-density polyethylenes is generally between 110° and 120° C, whereas the softening temperature is generally between 130° and 140° C. In the case of low density polyethylenes, these values are generally within the range of 90° - 100° C and 110° - 115° C, respectively). A disadvantage of suspension chlorination at elevated temperatures is that at these high temperatures, even when the reaction is conducted under pressure, the chlorine dissolves in the dispersing agent (which is generally water) only to a very small degree. As a result, the chlorination proceeds quite slowly and very long chlorination times are required.

In British Pat. No. 843,209, the difference between chlorinated polyolefins having a statistical and a non-statistical chlorine distribution are discussed. An intermediate type of chlorine distribution is sometimes obtained on the so-called hybridical polymers. These polymers, in contrast to the process of French Pat No. 1,316,044, are prepared, as taught by British Pat. No. 843,209, by a chlorination process which is partially effected in suspension and partially effected in solution. This two-stage process, however, is very cumbersome, as the polyethylene chlorinated in suspension must be separated from the suspension and subsequently dissolved, before the second stage can be conducted.

Bulk chlorination, for instance, by the process described in the above-mentioned U.S. Pat. No. 2,890,213 and British Pat. No. 834,905, can be conducted at rather high temperatures, at which the chlorination proceeds rapidly. However, a disadvantage of this chlorination process resides in the fact that during the initial phase of chlorination the reaction proceeds too fast, even if the initial phase is conducted at relatively low temperatures. Halogenation reactions in general and chlorination reactions specifically are exothermic reactions. In the chlorination of finely divided polyethylene, without a solvent or dispersing agent, heat is locally developed, causing the reaction speed to increase in the hot spots so developed, with increased heat development, and generally it is impossible for the heat to be discharged at a sufficient rate. This causes melting, and consequentially lump formation of the chlorinated polymer, as well as decomposition or even combustion to occur. If combustion occurs, generally a highly undesirable discoloration will result. Because of the fact that melting occurs locally, lumps may be formed whose subsequent chlorination proceeds in an extremely poor and irregular manner.

With bulk chlorination it is almost impossible to avoid polymer discoloration, unless the chlorination is conducted at such low temperatures that the reaction speed is quite slow, even in the presence of an initiator. In addition, at temperatures below the crystalline melting point of the polymer, no statistical chloropolyethylene will be obtained. Often the discoloration of the polymer is so serious that the resulting chlorinated polyethylene is of a brown color.

In order to improve the properties of the resulting chloropolyethylene, to increase the degree of chlorination, and for other purposes, a number of two-stage processes have been proposed, as mentioned in the above-cited French Pat. No. 1,316,044 and British Pat. No. 843,209. In addition, U.S. Pat. Nos. 2,398,803 and 2,920,064, German Auslegeschrift No. 1,420,451, British Pat. Nos. 1,073,504 and 1,036,360 describe the chlorination of polyolefins in two stages.

None of the prior art processes for chlorinating polyethylene to chloropolyethylene have been quite satisfactory. In particular, these prior art processes for the preparation of chloropolyethylene having a statistical chlorine distribution, or the preparation of hybridical chloropolyethylene, leave much to be desired.

DESCRIPTION OF THE INVENTION

The process of the present invention involves the chlorination of a solid, finely divided ethylene polymer to produce statistical or hybridical chloropolyethylene. The polymer is mixed with from 10 to 100% by weight of water, based on the weight of the ethylene polymer. The polymer is then chlorinated at a temperature which is above the crystalline melting point of the ethylene polymer during [a major part, i.e. at least 70% of] *at least part of* the chlorination period. The chlorination is conducted at a pressure such that the boiling point of water at the pressure is at least equal to the aforesaid chlorination temperature. The amount of water is maintained in the ethylene polymer within the aforesaid range, at a level of at least 10% by weight, based on the weight of starting ethylene polymer, until the chlorination has proceeded to a polymer chlorine content of at least 15% by weight, preferably 20% by weight. The polymerization may, if necessary, be conducted in the presence of an initiator or with the use of radiation which initiates the chlorination reaction. Statistical or hybridical chloropolyethylene can be obtained while avoiding the disadvantages of the prior art processes discussed hereinabove. Specifically, the disadvantages of high temperature suspension chlorination are eliminated, in that the chlorine need not dissolve in the dispersing agent, but can directly chlorinate the polyethylene.

The drawbacks of prior art processes for bulk chlorination, that is, the fusion and combustion of the polymer resulting from hot spots in such polymerization, do not occur with the process of the present invention because the temperature cannot rise in local areas above the boiling point of the water present at the pressure under which the chlorination is conducted.

As mentioned hereinabove, the chlorination reaction is at a pressure such that the boiling point of water at the pressure is at least equal to the chlorination temperature. Lower pressures may be used, if desired, toward the end of the chlorination reaction, especially after the polymer has been chlorinated to a polymer chlorine content of 20% by weight or greater. The chlorination pressure should not be so high that the resulting boiling point of water at that pressure is above the starting ethylene polymer decomposition temperature.

It is greatly preferred, at least during the first phase of chlorination to a polymer having a chlorine content of 15 - 20% by weight, for the boiling point of the water to lie below the softening point of the ethylene polymer. This means that in the case of high density polyethylene the chlorination temperature is preferably below 130° C, and for low density polyethylene, the chlorination temperature is preferably below 110° C. In the case of low density polyethylene, it may be desirable to operate at a slightly reduced pressure, so that the boiling point of water at that pressure will be between 90° and 100° C.

The excess chlorine in the hydrogen chloride formed during the chlorination may be passed through a condenser along with any water evaporated by the heat of reaction, and the condensed water can be returned to the chlorination zone. Following this procedure, the moisture content of the polyethylene during the chlorination reaction will not, or will hardly decrease. Of course, drying will then be necessary after the chlorination reaction is finished. Alternatively, the gradually evaporating water can be discharged from the reaction system, together with the excess chlorine and the hydrogen chloride formed during the chlorination. Once chlorination has been conducted to a certain extent, subsequent chlorination proceeds more smoothly, and the partially chlorinated polyethylene can be further chlorinated, even in the dry condition, without the hampering of local superheating occurring. At least 15% by weight of chlorine, and preferably at least 20% by weight of chlorine, based on the weight of the polymer should have been introduced into the polymer prior to the time the amount of water in the polymer is allowed to drop below 10% by weight, based on the starting ethylene polymer.

The process of the present invention proceeds appreciably faster, generally 3 - 5 or more times faster, than the suspension chlorination of polyethylene. The process of the present invention is substantially cheaper than solution chlorination of polyethylene, and, in distinct contrast to bulk chlorination, yields a white, uncolored product.

There is no real minimum on the amount of chlorine which can be incorporated into the ethylene polymer. The process of the present invention can be used to product chloropolyethylenes having chlorine contents of 10% by weight of chlorine, or even less, to 50% by weight of chlorine or even more. The chlorine content of the chloropolyethylene which is considered most desirable generally is about 30 - 48% by weight.

The chlorination may be conducted in the presence of radical-forming agents. For instance, the chlorination may be conducted in the presence of light, having a wavelength such that radical formation is promoted. In general, such light will have a wavelength of about 3000 to about 5000 A. In addition to or in place of light, radical-forming initiators may be used. At chlorination temperatures below 100° C, it may be desirable to initiate the radical formation. At chlorination temperatures below 80° C, the chlorination rate is so low that radical initiation may be considered absolutely necessary.

Suitable radical-forming initiators include the per compounds, such as organic peroxides such as dihydrocarbyl peroxydes, hydrocarbyl peroxides of 2 to 20 carbon atoms per hydrocarbyl group, dihydrocarbyl peroxy carbonates of 2 - 20 carbon atoms per hydrocarbyl group. The hydrocarbyl groups in the dihydrocarbyl per compounds may be the same or different. Suitable examples of these compounds include benzoyl peroxide, diisopropyl benzene hydroperoxide, cumene hydroperoxide, lauroyl peroxide and diisopropylperoxy dicarbonate. Also, azo compounds may be used, such as dihydrocarbylazodinitriles with 1 - 12 carbon atoms per hydrocarbyl group, preferably an alkyl or cycloalkyl group and wherein a cyanogen group is present at a carbon atom of a carbon chain with 1 - 10 carbon atoms which is in the $\alpha$-position in relation to the azo group, such as dimethyl and diethyl-$\alpha$, $\alpha'$-azodiisobutyronitrile and $\alpha$,[60']*60'*-azobis ($\alpha$,$\gamma$-dimethyl valeronitrile). Also initiators like acetylcyclohexylsulfonylperoxyde and related compounds may be used.

Generally any conventional radical-forming initiator known to the art may be used in the process of the present invention. For instance, any of the radical-forming initiators disclosed in the prior art patent cited hereinabove, the disclosures of which are hereby incorporated by reference, may be used if desired.

The process of the present invention is applicable for the chlorination of both low density polyethylene and high density polyethylene.

In order for the chlorination to proceed at a rapid rate, it is highly desirable that the reactive surface area of the polyethylene be as large as possible. For this reason, generally a finely divided polyethylene, and preferably a porous polyethylene will be used. Low density polyethylene obtained by the process described in U.S. Pat. No. 3,719,648 can be chlorinated according to the present invention in a particularly advantageous manner. Low density or high density polyethylene prepared by conventional processes may be given an increased reactive surface area, if necessary, by grinding or other particle size reduction treatments, and can in this way be rendered more suitable for the chlorination according to the present invention.

The particle size of the polyethylene will generally be no greater than 1 mm, and preferably is under 500 $\mu$.

The water should be as uniformly dispersed in the polyethylene as possible. Homogeneous distribution can be promoted by the addition of minor amounts of anionic, cationic or nonionic surface active agents. Any of the conventional surface action or wetting agents may be used such as polyvinylalcohol, polyethylene gylcol, polypropylene glycol, methylcellulose, etc. Less than 1% by weight of the wetting agent, based on the weight of the water, will suffice, and it is preferred that the amount of wetting agent be from 0.005 — about [about] 0.1% by weight. If chlorination is conducted in a rotary drum, for instance, the uniform distribution of the water over the polyethylene will prevent the undesirable effects of dry prior art chlorination processes described hereinabove.

If desired, or necessary, small amounts of electrolytes, such as inorganic acids and their alkali metal salts, including, for instance, HCl, NaCl, $Na_2SO_4$ LiCl etc., may be dissolved in the water to produce a more finely divided chlorinated chloropolyethylene. If electrolytes are used, they will normally be in an amount of from 1 - 50% by weight, based on the amount of water added to the polyethylene. The addition of the electrolyte also results in the boiling point of the water being raised. At a decreasing water content, a gradual rise of the boiling point will occur, which in some cases promotes a rapid chlorination.

Chlorinated polyethylenes having a chlorine content of 25 - 50% by weight, and a crystallinity of less than 2%, are of special importance, and are particularly preferred materials to be produced by the process of the present invention. Chloropolyethylenes of this nature have already found valuable application in various fields. They are compatible with most synthetic polymeric materials, and can be advantageously mixed with, for instance, PVC, polyethylene, ABS, EPDM rubbers, polystyrene, SAN and the like, to improve the impact resistance, the flexibility, the processability, to impart or to increase flame-resisting properties of various plastics, to improve oil resistance, etc.

To prepare chloropolyethylenes having a chlorine content of 25 - 50% by weight, and a crystallinity of less than 2%, by the process of the present invention, chlorination should be conducted such that the chlorine atoms are statistically distributed on the ethylene polymer, or that the so-called hybridical chloropolyethylenes are obtained, as explained above. To produce these chlorinated polymers, the chlorination must be wholly or [largely] *partly* conducted at a chlorination temperature above the crystalline melting point of the ethylene polymer, i.e. above 110° - 120° C in the case of high density polyethylene, and above 90° - 100° C in the case of low density polyethylene.

For some applications, it is desired to produce a chloropolyethylene having a crystallinity of 5 - 10%, and in this instance the process of the present invention should be conducted such that a larger proportion of the polyethylene will be chlorinated below the crystalline melting point of the ethylene polymer[. One] *than for the manufacture of corresponding chloro polyethylenes having a lower crystallinity. The required proportion of chlorination below the crystalline melting point cannot be given exactly, but one* having average skill in the art can easily determine by simple experiments that percentage of chlorine which is to be introduced below the crystalline melting temperature, and that percentage of chlorine which is to be introduced above the crystalline melting temperature, to achieve a certain desired crystallinity within the range of 5 - 10% by weight.

Particularly in the case of chlorination above the crystalline melting point of the ethylene polymer, it is of great importance that local superheating does not occur, and the present invention offers a method of preventing such local superheating.

Once 15 - 20% or more by weight of chlorine has been introduced into the ethylene polymer, the subsequent chlorination proceeds in a substantially better, controlled way, and the heat of reaction can be more uniformly discharged, so that in bulk chlorination the occurrence of local superheating can be opposed, or that such superheating just does not occur. This is also true if the chlorination is conducted at an elevated temperature above the crystalline melting point of the polyethylene. Up to a chlorine content of 15 - 20% by weight of chlorine, the chlorination process proceeds so critically that during this phase it is absolutely necessary, and critical, that from 10 - 100% by weight of water, based on the weight of the polymer, must be present.

By chlorinating the ethylene polymer in the presence of from 10 - 100% by weight of water, based on the weight of the polymer, the chlorination may be conducted rapidly while passing through the phase during which local heating, as well as consequential fusion and decomposition with decoloration, would be virtually unavoidable for the prior art bulk chlorination processes.

The required minimum [amouont] *amount* of water within a given chlorination phase can be easily established experimentally. This minimum quantity of water also depends upon the chlorination temperature and pressure, and the mode of realization. In any event, the water should not have fully evaporated before that chlorination phase is reached during which the chlorination proceeds more uniformly, without formation of hot spots. If evaporated water from the chlorination reaction is condensed and returned to the chlorination zone, smaller starting amounts of water in the ethylene polymer will, of course, suffice than will be the case if all of the evaporated water is discharged. It is also possible to first condense and return the evaporated water, and thereafter, after a certain degree of chlorination has been achieved, to discharge all of the water vapor in order to obtain a dry product at the end of the chlorination process. This embodiment, as well as others, will be quite clear to those skilled in the art. The most favorable chlorination conditions can easily be determined by experimental methods. There is no objection to a chlorination process wherein the water is not fully evaporated during the chlorination. Minor amounts of water are not disturbing during subsequent chlorination phases, and the small amounts of water still present in the chlorination polyethylene can be easily expelled therefrom. It is preferred and more advantageous, however, to so choose the chlorination conditions such that water is no longer present at the end of the chlorination process. In this instance, it will be sufficient to free the chloropolyethylene from chlorine and hydrogen chloride by blowing an inert gas therethrough.

Surprisingly, in the chlorination of ethylene polymers in the presence of water, the chlorination speed depends upon the quantity of water present. The degree of suspensions may be defined as the value of the formula:

$$\frac{\text{parts by weight of polyethylene}}{\text{parts by weight of dispersing agent (= water) + p.b.w. of polyethylene}} \times 100.$$

At a degree of suspension of at most 50, the chlorination speed is practically independent of the degree of suspension. If the degree of suspension rises above 50, a more or less sudden increase to much higher chlorination speeds occurs. Above a degree of suspension of 60, the increase becomes smaller, and from a degree of suspension of about 70, the chlorination speed increases practically linearly, at a slow rate, as the degree of suspension increases. In general, a degree of suspension of 65 - 95% results in a chlorination speed which differs only little from that occurring in conventional bulk chlorination, other conditions remaining the same. It will be clear to those in the art that the absolute chlorination speed also depends upon the chlorination temperature, irradiation conditions, the initiators, the partical size and porosity of the polyethylene polymer and the like. Once these parameters have been fixed, however, the great influence of the degree of suspension upon the chlorination speed becomes apparent, as is set forth in greater detail for certain reaction conditions in Example 2 hereinbelow. It is most surprising and unanticipated that within the degree of suspension range of from 50 - 65 a sudden, abrupt change occurs in the chlorination speed.

At a degree of suspension of 9.1 (which means that the amount of water by weight is 10 times that of the polyethylene) a suspension is obtained which can be easily stirred. At a degree of suspension of 16.7 (.i.e. the weight of water : weight of polyethylene is 5:1), the suspension exhibits only moderate ease of handling. At equal quantities of water and polyethylene (i.e. a degree of suspension of 50), a wet system, somewhat like wet sand, is obtained which is no longer a suspension. In the chlorination of wet systems of this type, proper stirring must be provided. The chlorination may take place in rotary drums, for instance, but also in stationary reactors, provided that the wet polyethylene is vigorously stirred during the chlorination. A ribbon stirrer, for instance, is suitable for stirring during the reaction. The chlorination may be effected in a batchwise, continuous or semi-continuous method, and in addition a multistage process may be used is desired. The chlorination may be advantageously conducted in two reactors, for instance, in two rotary drums connected in series, wherein the chlorination is conducted below the crystalline melting point of polyethylene in the first reactor and above this point in the second reactor.

The usual additives may be incorporated into the chloropolyethylenes produced by the process of the present invention. As mentioned above, these chlorinated polyethylenes may be mixed with various types of plastic materials in order to improve the properties thereof.

EXAMPLES OF THE INVENTION

Example I (Comparative example)

For comparative purposes, polyethylene was chlorinated in suspension, with return of the evaporated and subsequently condensed water to the reactor, so that the degree of suspension was practically constant during the duration of the chlorination process.

25 g of finely divided linear polyethylene and 250 g of water were added to a glass reaction vessel having the volume of 1 liter and equipped with a stirrer, a thermometer and a reflux cooler with a gas outlet at the top thereof, and an inlet tube for chlorine gas. The polyethylene had been prepared by the conventional Ziegler low-pressure process, and had a melt index of 0.3 measured according to ASTM-D 1238, a specific gravity of 0.958, a DSC* crystallinity of 68%, and a particle size of $< 500\ \mu$. Air was expelled from this system by passing nitrogen through the suspension for half an hour.

*Differential Scanning Calorimeter

Then the suspension was heated to a temperture of 95° - 100° C, with vigorous stirring, with return of evaporated water to the suspension through the reflux cooler. 0.125 g of the radical initiator listed in Table 1 hereinbelow (0.5% by weight, based on the polyethylene) was added and then 25 liters of chlorine gas per hour were passed through the stirred suspension for two hours, with the chlorination temperature being maintained at 95° - 100° C. Atmospheric pressure was utilized and under these conditions no statistical chlorination was obtained. This example is presented, however, only to demonstrate the low chlorination speed which occurs with suspension chlorination. The off-gases from the system were led through a cold trap and through a cool solution of NaOH in water, in order to bind hydrochloric acid and unconverted chlorine. At the end of the chlorination, nitrogen was passed through the suspension to expel chlorine gas and hydrochloric acid therefrom.

The cooled suspensions was then filtered, and the polymer particles were successively washed with deionized water, with a dilute solution of $Na_2Cl_3$ and water, and again with deionized water. The polymer particles were the dried at 50° C and 10 mm Hg until a constant weight was reached, whereupon the chlorine content was determined by elementary analysis, with the results set forth in Table 1 below.

Table 1

| radical initiators applied | % by weight of Cl in reaction product |
|---|---|
| α, α'-azo-di-isobutyronitril | 5.6 |
| lauroyl peroxide | 3.1 |
| dicumyl peroxide | 1.9 |

The results obtained hereinabove indicate that chlorination in suspension at 95° - 100° C at atmospheric pressure proceeds very slowly.

Exampe II *(comparative example)*

Using the procedure of Example 1, a number of experiments were conducted in which the same linear polyethylene was chlorinated in the presence of 0.125 g of α,α' azo-di-isobutyronitrile (AIBN) as the radical initiator, and in which the degree of suspension was varied. The degree of suspension has been defined hereinabove, and is calculated by the formula:

$$\frac{\text{parts by weight of PE}}{\text{parts by weight of dispersin agent (= water) + p.b.w. of PE}} \times 100$$

For comparative use, two experiments were conducted with the degree of suspension being appreciably less than 50, and one experiment was conducted with the degree of suspension being just below this value, and it will be appreciated that these experiments, test runs No. 1 - 3 in Table 2 hereinbelow, are outside of the scope of the present invention. In addition, test run No. 5 in Table 2 relates to a bulk chlorination which is also outside of the scope of the present invention. The chlorinations were conducted below the crystalline melting temperature of the polyethylene for the sake of simplicity, so no statistical chlorination was obtained. The results of these experiments are set forth in Table 2 below.

Table 2

| test no. | degree of suspension | description of the reaction system | % b.w. of Cl in end-product (after 2 h of chlorination) | description of the end-product |
|---|---|---|---|---|
| 1 | 9.1 | well-stirrable suspension | 5.7 | white, finely divided polymer |
| 2 | 16.7 | moderate suspension | 4.7 | white, finely divided polymer |
| 3 | 45 | wet system, no longer a suspension | 4.9 | white, finely divided polymer |
| 4 | 66.7 | moist bulk system | 28.0 | white, finely divided polymer |
| 5 | 100 | dry bulk system | 33.5 | finely divided polymer with a few lumps showing internal carbonization ranging in colour from brown to black |

Example III *(comparative example)*

25 g of linear polyethylene (having a melt index of 0.3, a density of 0.958, a DSC crystallinity of 68%, and a particle size of < 500μ), a given amount of water, as set forth in Table 3, and 0.125, g of α,α'azo-di-isobutyronitrile (AIBN) dissolved in a small amount of methanol were added to a rotary glass drum equipped with a chlorine gas inlet, an off-gas outlet, and a thermocouple with an automatic temperature recorder. The drum was rotated at about 60 rpm with nitrogen being passed through the drum contents to remove air. The drum was then rotated at the same speed through an oil bath maintained at 100° C while chlorine gas was passed at a rate of 26 liters per hour through the drum contents. In a short while, a constant temperature of about 95° C was reached in the drum. The evaporating water was discharged together with the off gases. After a reaction time of 2 hours, the chlorine feed was stopped, and excess chlorine gas and HCl were removed from the reactor by blowing with nitrogen. The white polymer particles were flushed out of the reactor with deionized water and washed, subsequently rewashed with a dilute aqueous caustic solution, and then washed again with deionized water. The polymer particles were dried at 50° C and 10 Hg until a constant weight was reached. The chlorine content and the crystallinity were determined, with the results set forth in Table 3.

Table 3

| test no. | degree of suspension | final condition of the reactor system | % b.w. of Cl in end-product | % crystallinity in end-product |
|---|---|---|---|---|
| 6 | 9.1 | wet to moist system | 13.5 | 35.4 |
| 7 | 25 | dry system | 26.4 | 24.9 |
| 8 | 50 | dry system | 31.9 | 17.7 |
| 9 | 66.7 | dry system | 33.4 | 18.4 |
| 10 | 80 | dry system | 38.4 | 14.6 |

The results obtained hereinabove indicate that the chlorination reaction proceeds substantially more rapidly at a degree of suspension of 50 or higher. When a degree of suspension of 25 is used for the starting materials, a degree of suspension of 50 or higher will be reached after the chlorination reaction has proceeded for some time, with evaporation of water, and at this time the chlorination speed will increase markedly. As a result of this occurring, the chlorination of 26.4% was reached at the conclusion of test run No. 7 of Table 3.

Example IV

Example II was repeated, except the chlorinations were conducted with an oil bath temperature of 125° C, with the polymerization results set forth in Table 4 below.

Table 4

| test no. | degree of suspension % | final condition of the reactor system | % b.w. of Cl in end-product | description of the end-product |
|---|---|---|---|---|
| 11 | 50 | dry system | 44.6 | white polymer particles |
| 12 | 66.7 | dry system | 42.0 | white polymer particles |
| 13 | 80 | dry system | 44.4 | contains a small number of yellow particles |
| 14 | 100 | dry system | 43.8 | contains brown to black particles |

In test 13 of Table 4, at the chlorination temperatures used the water evaporated so rapidly that the polymer became dry before a chlorination of 15 - 20% had occurred, as a result of which some polymer discoloration was noted. *Test 14 has been included for comparative purposes and shows that while the chlorination proceeded at a satisfactory rate, the product was unsatisfactory due to discolorations.*

Example V

The procedure of Example II was repeated for a series of linear polyethylene chlorinations, with a degree of suspension of 66.7% used for all runs. However, the chlorinations were conducted for different periods of time, and at oil bath temperatures of 100° C and 130° C (chlorination temperatures of 95° C and 125° C, respectively), with the results indicated in Table 5 below.

Table 5

| test No. | chlorination time at a reaction temperature in the reactor of 95° C | 125° C | % b.w. of Cl in end-product | % of crystallinity |
|---|---|---|---|---|
| | 0 min. | 0 min. | 0 | 68.0 starting product |
| 15 | 15 min. | — | 17.9 | 27.3 |
| 16 | 30 min. | — | 22.0 | 21.4 |
| 17 | 45 min. | — | 26.7 | 19.0 |
| 18 | 60 min. | — | 31.5 | 14.0 |
| 19 | 15 min. | 15 min. | 30.4 | 13.6 |
| 20 | 15 min. | 30 min. | 37.4 | <1 |
| 21 | 15 min. | 45 min. | 41.9 | <1 |
| 22 | 15 min. | 60 min. | 43.3 | <1 |
| 23 | 45 min. | 15 min. | 35.9 | <1 |
| 24 | 45 min. | 30 min. | 39.8 | <1 |
| 25 | 45 min. | 45 min. | 40.5 | <1 |
| 26 | 45 min. | 60 min. | 42.5 | <1 |
| 27 | 60 min. | 60 min. | 43.7 | <1 |
| 28 | 90 min. | 30 min. | 40.5 | <1 |

Example VI

A series of polyethylene chlorinations were conducted in a manner analogous to that of Example V. In this case, however, different polyethylenes were used as the starting polymer, with 0.125 g of α,[60']*60'*-axo-diisobutronitrile, 7.5 g of NaCl, and 12.5 g of deionized water (degree of suspension of 66.7) added to 25 g of the ethylene polymer. In all cases, the ethylene polymer particle size was <500 μ. The chlorination results are summarized in Table 6 below.

Table 6

| | test data of the starting polyethylene: kind of polyethylene | density | melt index | Vicat softening point ° C | chlorination time at 95° C | 125° C | % b.w. of Cl in end-product | crystallinity |
|---|---|---|---|---|---|---|---|---|
| 30 | low-density | 0.917 | 22 | 88 | 60 min. | — | 31.0 | 5.4 |
| 31 | low-density | 0.918 | 1.7 | 88 | 15 min. | 45 min. | 43.7 | <1 |
| 32 | low-density | 0.920 | 0.3 | 90 | 60 min. | — | 39.5 | 5.4 |
| 33 | low-density | 0.923 | 4.4 | 95 | 60 min. | — | 36.0 | 5.2 |
| 34 | high-density | 0.953 | 19 | 124 | 15 min. | 45 min. | 44.3 | <1 |

What is claimed is:

1. Process for chlorinating a solid, finely divided ethylene polymer to produce statistical or hybridical chloropolyethylene, said process comprising a. mixing said polymer with 10 to 100% by weight of water, based on the weight of ethylene polymer, and b. chlorinating the polymer with gaseous chlorine at a temperature which is below the ethylene polymer decomposition temperature and above the crystalline melting point of the ethylene polymer during [at least about 70%] *a part* of the chlorination period and at a pressure such that the boiling point of water at said pressure is at least equal to the said chlorination temperature while maintaining the amount of water in the ethylene polymer at a level of at least 10% by weight, based on the weight of starting ethylene polymer, until the chlorination has proceeded to a polymer chlorine content of at least 15% by weight and maintaining the water substantially uniformly distributed in the polymer.

2. Process according to claim 1, wherein the chlorination is conducted in the presence of a chlorination reaction initiator or radiation which initiates the chlorination reaction.

3. Process according to claim 1, wherein the chlorination temperature is below the softening point of the starting ethylene polymer at least during the chlorination to a polymer chlorine content of 15% by weight.

4. Process according to claim 1, wherein at least 10% by weight of water is present, based on the weight of starting ethylene polymer, until the chlorination has proceeded to a polymer chlorine content of at least 20% by weight.

5. Process according to claim 1, wherein from 0.05 - 1% by weight of a wetting agent, based on the weight of water, is incorporated in the ethylene polymer/water system.

6. Process according to claim 5, wherein no more than 0.1% by weight of the wetting agent, based on the weight of the water, is used.

7. Process according to claim 1, wherein at least 1 strong acid or strong acid salt electrolyte is incorporated in the ethylene/polymer water system in an amount of at most 50% by weight of electrolyte, based on the weight of the water.

8. Process according to claim 7, wherein at least 1% by weight of the electrolyte is used.

9. Process according to claim 1, wherein water which is evaporated during the chlorination is condensed and returned to the chlorination zone during at least a portion of the chlorination reaction.

10. Process according to claim 1, wherein the water which is evaporated in the chlorination zone during the chlorination reaction is discharged from said zone.

11. Process according to claim 1, wherein the chlorination is continued until the resulting chlorinated ethylene polymers have a chlorine content of from 10 to about 50% by weight.

12. Process according to claim 11, wherein said chlorine content is 30 - 48% by weight.

13. Process according to claim 10, wherein at least during the latter portion of the chlorination reaction, water is removed so that the final chlorinated ethylene polymer is obtained in a dry state.

14. Process according to claim 1, wherein the degree of suspension of the ethylene/polymer water mixture is from 50 - 65 during at least a portion of the chlorination reaction.

15. Process according to claim 1, wherein the chlorination temperature is above the crystalline melting point of the ethylene polymer during substantially all of the chlorination period.

* * * * *

UNITED STATES PATENT OFFICE

CERTIFICATE OF CORRECTION

Patent No. Re. 29,350 Dated August 9, 1977

Inventor(s) Lowhardt A. A. Schoen

It is certified that error appears in the above-identified patent and that said Letters Patent are hereby corrected as shown below:

On the Title Page Insert:

-- Foreign Application Priority Data

Aug. 28, 1973 Netherlands 7311780 --.

Signed and Sealed this

*Fifteenth* Day of *November 1977*

[SEAL]

*Attest:*

RUTH C. MASON
*Attesting Officer*

LUTRELLE F. PARKER
*Acting Commissioner of Patents and Trademarks*